US006657350B2

United States Patent
Kimura et al.

(10) Patent No.: US 6,657,350 B2
(45) Date of Patent: Dec. 2, 2003

(54) PERMANENT MAGNET TYPE ROTATING ELECTRICAL MACHINE, AND POWER GENERATION SYSTEM AND DRIVE SYSTEM USING IT

(75) Inventors: Mamoru Kimura, Hitachi (JP); Haruo Koharagi, Juo (JP); Hiroyuki Mikami, Hitachinaka (JP); Miyoshi Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/962,124

(22) Filed: Sep. 26, 2001

(65) Prior Publication Data

US 2002/0145353 A1 Oct. 10, 2002

(30) Foreign Application Priority Data

Apr. 5, 2001 (JP) ........................... 2001-106972

(51) Int. Cl.⁷ ................ H02K 21/14; H02K 1/22; H02K 1/24
(52) U.S. Cl. ................ 310/156.57; 310/156.53
(58) Field of Search ............... 310/156.53–156.56, 310/156.57, 156.83, 156.84, 179, 180, 184

(56) References Cited

U.S. PATENT DOCUMENTS

| | | | | |
|---|---|---|---|---|
| 5,097,166 A | * | 3/1992 | Mikulic | 310/156 |
| 5,304,882 A | * | 4/1994 | Lipo et al. | 310/156 |
| 5,811,904 A | * | 9/1998 | Tajima et al. | 310/156 |
| 6,025,667 A | * | 2/2000 | Narita et al. | 310/156 |
| 6,268,677 B1 | * | 7/2001 | Takabatake et al. | 310/156.55 |
| 6,340,857 B2 | * | 1/2002 | Nishiyama et al. | 310/156.53 |
| 6,396,183 B1 | * | 5/2002 | Tajima et al. | 310/156.53 |
| 6,441,525 B1 | * | 8/2002 | Koharagi et al. | 310/156.56 |

FOREIGN PATENT DOCUMENTS

| | | |
|---|---|---|
| DE | 198 51 883 A1 | 5/2000 |
| JP | 5-103453 | 4/1993 |
| JP | 6-189481 | 7/1994 |
| JP | 9-163647 | 6/1997 |
| JP | 10-178751 | 6/1998 |
| JP | 10-285845 | 10/1998 |
| JP | 10-285851 | 10/1998 |
| JP | 11-252840 | 9/1999 |

OTHER PUBLICATIONS

Patent Abstracts of Japan, vol. 17, No. 460 (E–1419), Aug. 23, 1993 & JP 05 103453 A (Toshiba Corp), Apr. 23, 1993.
Patent Abstracts of Japan, vol. 1996, No. 4, Apr. 30, 1996 & JP 07 336917 A (Toshiba Corp), Dec. 22, 1995.
Patent Abstracts of Japan, vol. 1999, No. 5, May 31, 1999 & JP 11 046464 A (Sanyo Electric Co Ltd), Feb. 16, 1999.
Patent Abstracts of Japan, vol. 1997, No. 9, Sep. 30, 1997 & JP 09 131009 A (Mitsubishi Electric Corp).
Patent Abstracts of Japan, vol. 1999, No. 14, Dec. 22, 1999 & JP 11 252840 A (Meidensha Corp.), Sep. 17, 1999.

* cited by examiner

Primary Examiner—Tran Nguyen
(74) Attorney, Agent, or Firm—Dickstein Shapiro Morin & Oshinsky LLP

(57) ABSTRACT

A permanent magnet type rotating electrical machine characterized by reduced vibration and noise, or improved efficiency. In a permanent magnet type rotating electrical machine comprising a stator 10 provided with concentrated winding and a rotor with permanent magnets 24 embedded in the rotor core 21, induced voltage waveform is improved by formation of two grooves or holes (flux barriers) extending in the axial direction for each magnetic pole on the bridge 25 of the core between the permanent magnet insertion hole 23 and the outer surface of rotor 20 in such a way that they are placed at an equally spaced interval over the entire circumference of the rotor 20.

8 Claims, 9 Drawing Sheets

PERMANENT MAGNET TYPE ROTATING ELECTRICAL MACHINE, AND POWER GENERATION SYSTEM AND DRIVE SYSTEM USING IT

BACKGROUND OF THE INVENTION

1. Field of the Invention

The present invention relates to the improvement of a permanent magnet type rotating electrical machine and the system using it.

2. Description of Prior Art

In a permanent magnet type rotating electrical machine with stator winding formed on the stator in distributed winding method, it is possible to bring the induced voltage waveform closer to sinusoidal waveform by improving the stator wiring layout and to reduce distortion rate. However, in the permanent magnet type rotating electrical machine with stator wiring formed on the stator in concentrated winding method, it is not possible to improve wiring layout on the stator.

The Japanese Patent Laid-Open Application No. Hei 06-189481 (JP A 06-189481) discloses that multiple slits are formed on the outer periphery of the magnet storage hole to improve punching work of a thin steel plate constituting the armature core and to reduce the circumferential leakage of magnetic flux. The Japanese Patent Laid-Open Application No. Hei 11-252840 (JP A 11-252840) discloses that slots are installed between the outer periphery of the rotor and the embedded magnet in order to create magnetic resistance, thereby preventing magnetic flux on the horizontal axis. However, these disclosures do not include any description of wiring on the stator side.

A permanent magnet type rotating electrical machine with stator winding formed on the stator in distributed winding method is disclosed in the Japanese Patent Laid-Open Application No. Hei 05-103453 (JP A 05-103453). According to this disclosure, in a salient pole type brush-less d.c. motor, holes are formed at positions corresponding to 60 and 120 degrees in terms of electric angle of the salient pole to remove the cogging torque of the permanent magnet type rotating electrical machine. Furthermore, the Japanese Patent Laid-Open Application Nos. Hei 09-163647 (JP A 09-163647), Hei 10-178751 (JP A 10-178751), Hei 10-285845 (JP A 10-285845) and Hei 10-285851 (JP A 10-285851) disclose that, in a permanent magnet type rotating electrical machine with stator winding formed on the stator in distributed winding method, a slit or narrow portion is formed between the outer periphery of the rotor and permanent magnet.

SUMMARY OF THE INVENTION

Problems to be Solved by the Invention

When the rotating electrical machine according to the prior art is used in a drive system or power generation system, problems still remain in reducing vibration and noise and in improving efficiency.

An object of the present invention is to provide a permanent magnet type rotating electrical machine and a system using such a machine characterized by reduced vibration and noise and improved efficiency.

Means for Solving the Problems

In a drive system, a big vibration noise may occur to the rotating electrical machine and characteristics are deteriorated. And such problems as heat generation, reduced efficiency and deteriorated characteristics may occur to a power generation system. These problems are considered to be caused by an excessive waveform distortion rate of the induced voltage in the permanent magnet type rotating electrical machine. As a result, harmonic wave current flows to the rotating electrical machine so that pulsation torque, vibration and noise are increased or efficiency and characteristic is deteriorated.

One of the characteristics of the present invention is found in that, in a permanent magnet type rotating electrical machine comprising;

a stator with concentrated winding provided on the tooth of the stator core, and a rotor with permanent magnets embedded therein;

two flux barriers extending in the axial direction are provided for each magnetic pole of the rotor on the bridge between the permanent magnet constituting a magnetic pole and the outer surface of the rotor at the position where the width of the permanent magnet is divided into three parts in such a way that the ratio of each of both ends and center is 1 to 2 or more. It is preferred that flux barriers made of grooves and holes be formed at an equally spaced interval over the entire outer periphery of the rotor.

In this case, height coefficient C1 is preferred to be defined as $0.2 \leq C1 \leq 0.6$ when $t=C1.h$ is assumed, where "t" (mm) is the height of said flux barrier as a groove or hole, and "h" (mm) is the thickness of said bridge. It is preferred that groove width coefficient C2 be defined as $0.5 \leq C2 \leq 1.2$ when $W2=C2.Wt$ is assumed, where W2 (mm) is width between the bridge and the adjacent flux barrier of the groove or hole, and Wt (mm) is the width of the tooth of said stator core.

Such an arrangement of flux barriers causes local magnetic saturation on the bridge of the magnetic pole, and the magnetic path is divided into three portions; one big magnetic path at the center and two smaller ones on both sides. As a result, the the waveform of the surface magnetic flux density of the rotor is brought closer to the sinusoidal waveform, thereby reducing the distortion of induced voltage waveform.

Application of this rotating electrical machine to a power generation system or drive system allows high-quality power energy to be generated and supplied, and permits driving force with less vibration or noise to be provided.

DETAILED DESCRIPTION OF EMBODIMENTS OF THE INVENTION

Figure 1:
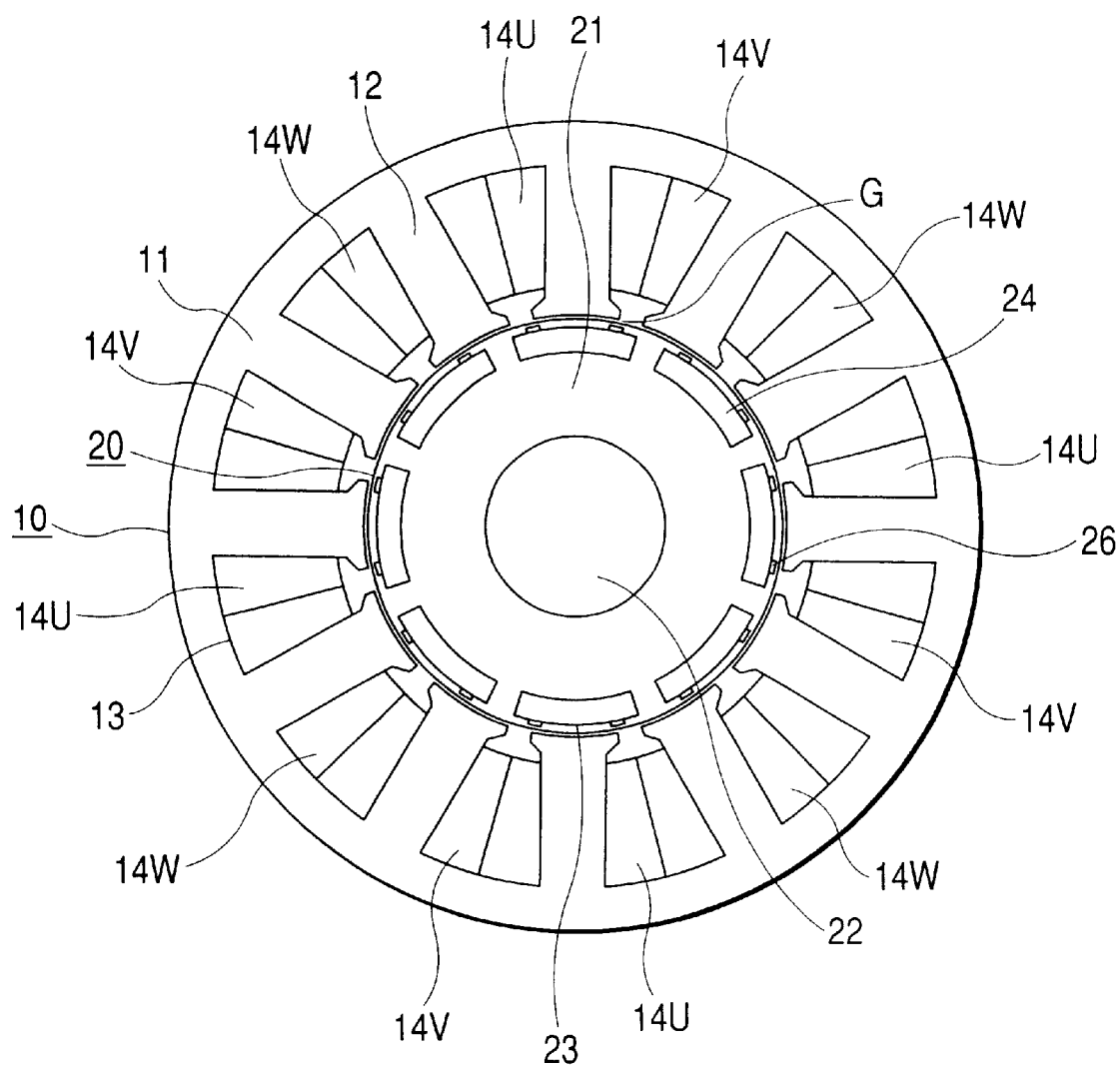
FIG. 1 is a cross sectional view at a right angle to the shaft representing a permanent magnet type rotating electrical machine as one embodiment of the present invention.

Embodiments of the prevent invention will be described hereunder with reference to the drawings:

FIG. 1 is a cross sectional view at a right angle to the shaft representing a 3-phase, 8-pole, 12-slot permanent magnet type rotating electrical machine as one embodiment of the present invention. In FIG. 1, stator 10 is configured by concentrated winding of the U-phase stator wiring 14U, V-phase stator wiring 14V and W-phase stator wiring 14W on the stator teeth 12 in twelve slots 13 formed in the almost annular stator core 11. A rotor 20 is formed by fitting the rotor core 21 into rotary shaft 22 and locking it therein and by inserting and assembling eight arc-shaped permanent magnets 24 into the punched permanent magnet insertion holes 23 formed in the rotor core 21 in such a way that the N and S poles will be located alternately in the axial direction. The rotor 20 is installed rotatably inside the stator 10 so that it has a gap G with the tip of the stator teeth 12. Grooves 26 are formed on the bridge 25 on the outer periphery of the permanent magnet insertion hole 23 as flux barriers.

Figure 2:
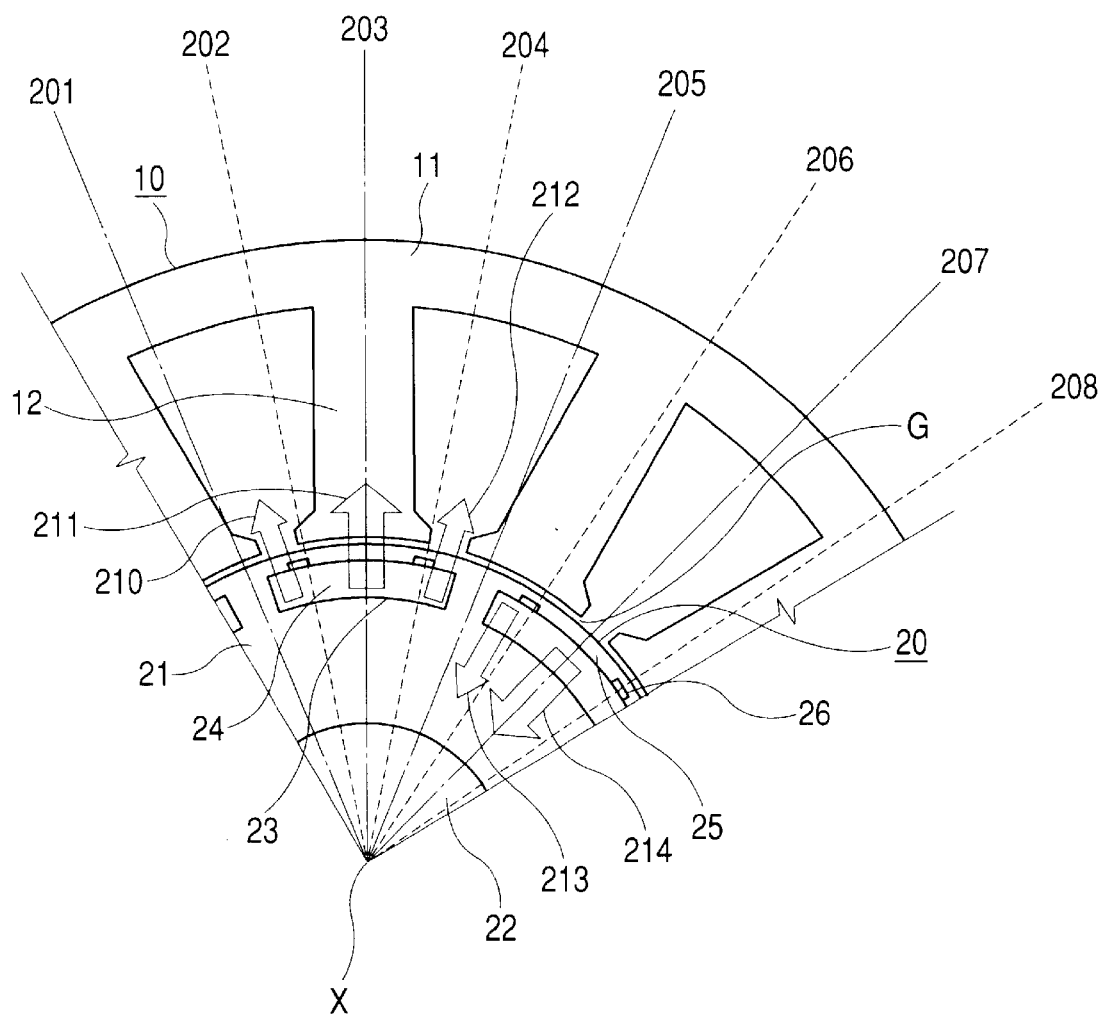
FIG. 2 is an enlarged view representing the relationship between stator tooth 12 and rotor 20 in FIG. 1.

FIG. 2 is an enlarged view representing the relationship between stator tooth 12 and rotor 20 in FIG. 1. Extension lines 201 to 208 extending from the center point X of the rotary shaft 22 denote electric angles of 0, 45, 90, 135, 180, 225, 270 and 315 degrees, respectively. Arrow marks 210 to 214 designate magnetic paths. Grooves 26 formed on the permanent magnet 24 side of the bridge 25 are provided at electric angles of 45, 135, 225 and 315 degrees at an equally spaced interval.

According to the present embodiment, in a permanent magnet type rotating electrical machine comprising a stator 10 with concentrated winding provided on the tooth of the stator core 11 and a rotor 20 with permanent magnets 24 embedded therein, two grooves 26 extending in the axial direction as flux barriers are formed for each magnetic pole of the rotor 20 on the bridge 25 between the permanent magnet 24 and outer surface of the rotor 20 to ensure that these grooves are located at an equally spaced interval at an electric angle of 90 degrees at a distance of W2 (FIG. 4) over the entire outer periphery of rotor 20.

Formation of such flux barriers causes local magnetic saturation on the bridge. When the magnetic path is divided as shown by arrow marks 210 to 214, the waveform of the surface flux density distribution of the rotor 20 comes closer to sinusoidal waveform, with the result that the distortion rate of induced voltage waveform is reduced. In other words, magnetic paths 211 and 214 at the center of the magnetic pole have twice the width those of magnetic paths 210, 212, 213 and 215 (not illustrated) on both sides. As a result, the waveform of the magnetic flux density generated by these magnetic poles comes close to the sinusoidal waveform.

However, without the barriers being located at an equally spaced interval over the entire circumference of the rotor 20, the waveform of the magnetic flux density can be brought closer to the sinusoidal waveform if two flux barriers extending in the axial direction are arranged for each magnetic pole of the rotor at the position where the width of the permanent magnet 24 is divided into three parts at the position where the width of the permanent magnet 24 or the magnetic pole is divided into three parts in such a way that the ratio of each of both ends and center is 1 to 2 or more. As in the aforementioned embodiment, when flux barriers are arranged at an equally spaced interval over the entire outer periphery of the rotor, further reduction of cogging torque can be achieved, according to the experiment conducted by the present inventors.

Figure 3:
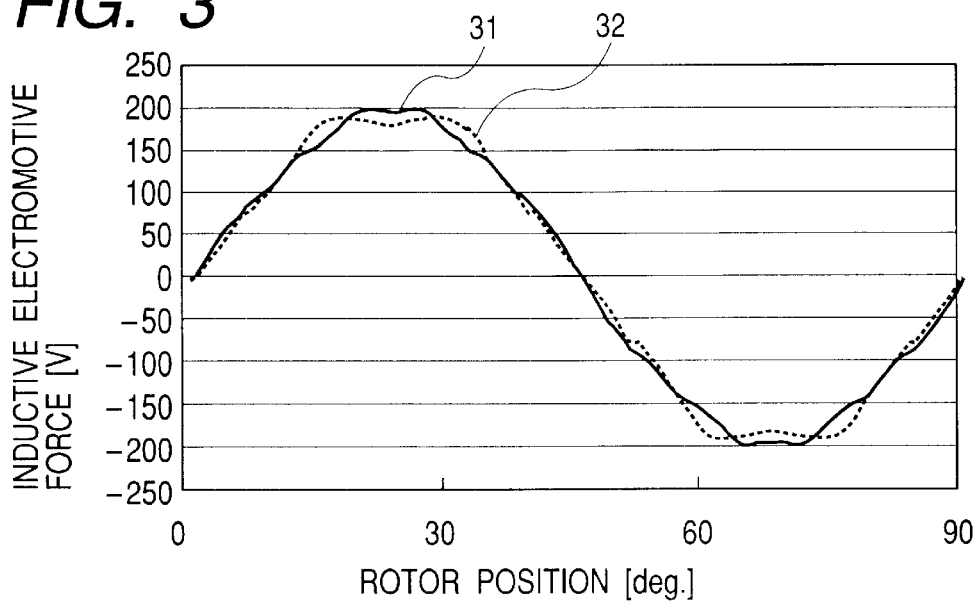
FIG. 3 shows an induced voltage waveform illustrating the effect of the embodiment of FIG. 1.

FIG. 3 shows an induced voltage waveform illustrating the effect of the embodiment of FIG. 1. The horizontal axis (of a graph) indicates the rotor position (shown in terns of mechanical angle), and the vertical axis represents the induced voltage value. It shows the induced voltage waveform 31 in the embodiment of FIG. 1 when grooves 26 are formed, and induced voltage waveform 32 without grooves 26. The distortion rate R (%) of the induced voltage waveform is represented by the percentage of the total sum of rms 2- to N-degree frequency components with respect to rms fundamental wave frequency components when induced voltage waveform is subjected to expansion into Fourier series, and N-degree frequency component is subjected to f(N). The distortion rate R of the induced voltage waveform is calculated using the result of FIG. 3. The distortion rate R of the induced voltage waveform 32 is 11.1 percent, whereas distortion rate R of induced voltage waveform 31 according to the present embodiment is 7.62%. This indicates that distortion rate R is decreased to about two thirds by formation of grooves 26 as flux barriers.

Figure 4:
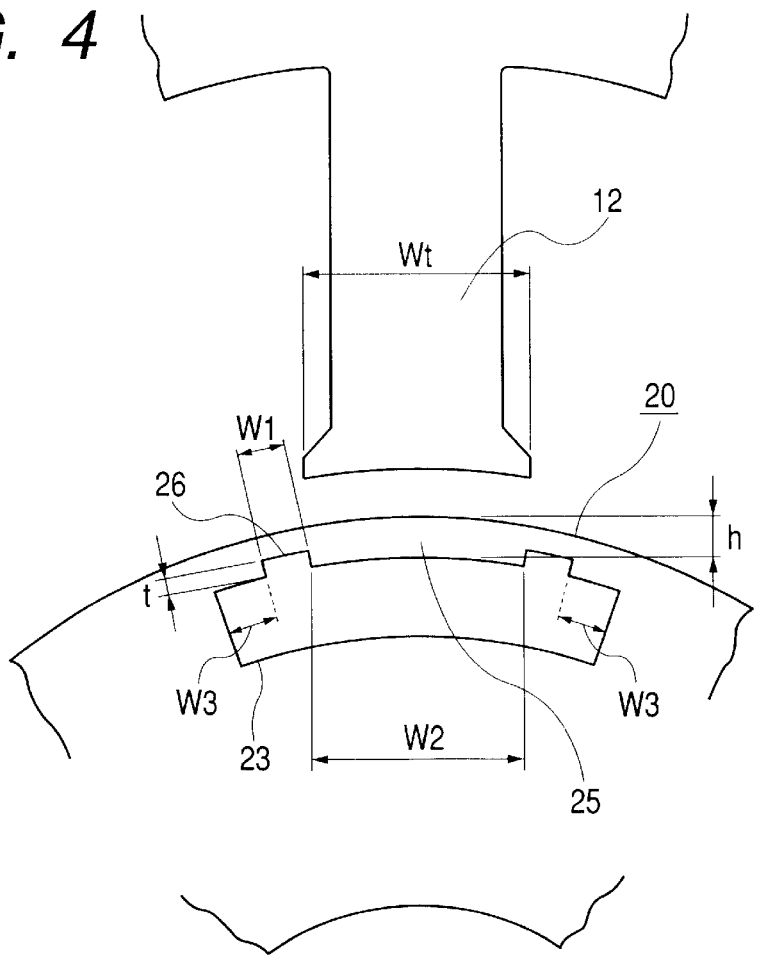
FIG. 4 is an enlarged view illustrating the dimensions of major parts in FIG. 1.

FIG. 4 is an enlarged view of stator teeth 2 and permanent magnet insertion holes 23 as the embodiment in FIG. 1. In FIG. 4, coefficient C1 of groove height is defined as $0.2 \leq C1 \leq 0.6$ when the height "t" of the groove 26 is represented as t=C1. h using the thickness "h" of the bridge 25. Groove width coefficient C2 is defined as $0.5 \leq C2 \leq 1.2$ when the width W1 (mm) of the groove 26 is represented as W2=C2.Wt, using the width W2 (mm) between two grooves 26 located at the bridge and the width Wt (mm) of the stator core tooth 12. In one embodiment, dimensions are determined as follows: Width Wt of tooth 12: 9 mm, width W1 of groove 26: 1 mm, space W2 between grooves 26: 8 mm, width W3 of magnet insertion holes 23 outside the groove 26: 1.2 mm, bridge thickness h: 1 mm, and height t of groove 26: 0.5 mm. In this case, the maximum value W1max of width W1 of groove 26 that can be adopted is 2 mm, and the minimum value W1min of the same is 0.6 mm. In this way, width W2 of the magnetic path at the center is divided by groove 26 and is greater than twice width W3 of the magnetic path on both sides.

Figure 5:
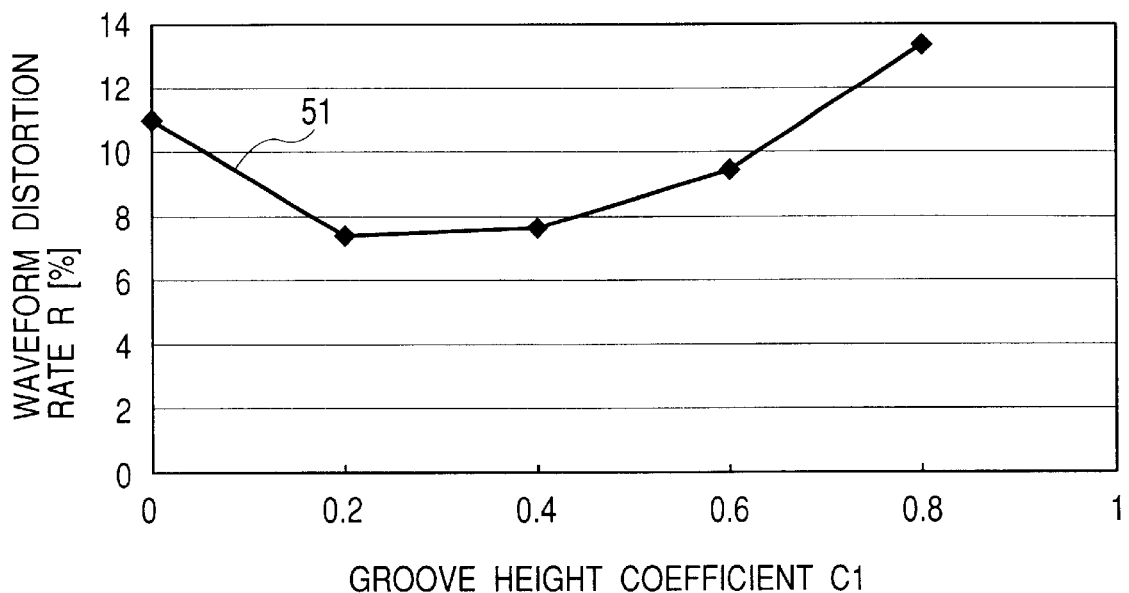
FIG. 5 is a chart representing the characteristics of waveform distortion rate R with respect to groove height in FIG. 1.
Figure 6:
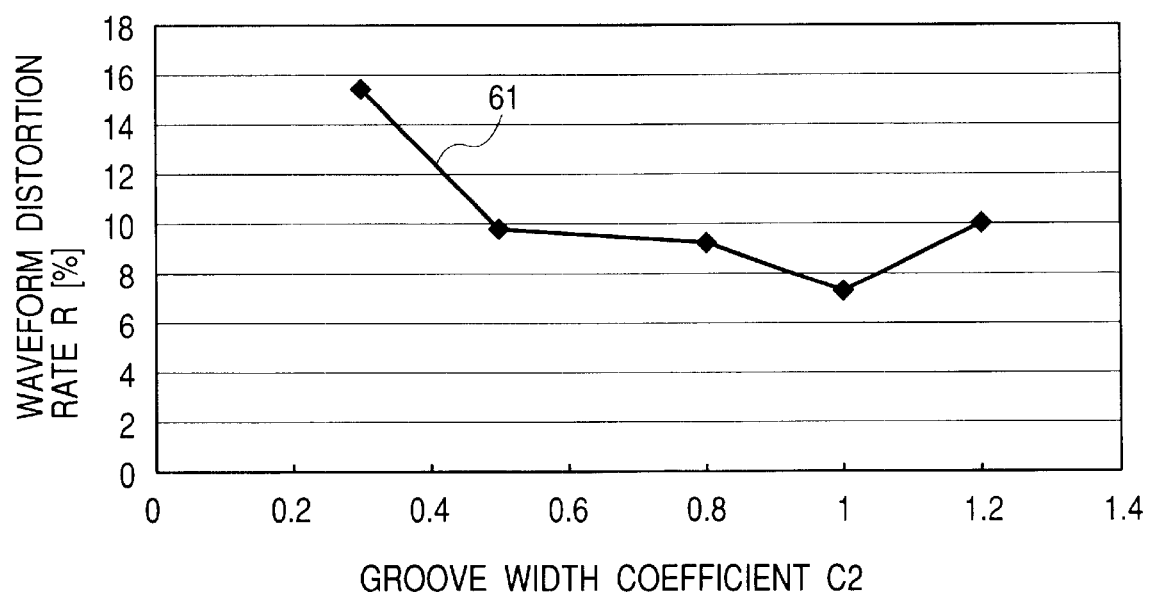
FIG. 6 is a chart representing the characteristic of waveform distortion rate R relative to the groove width in FIG. 1.

With reference to FIGS. 5 and 6, the following describes why groove height coefficient C1 and groove width coefficient C2 are defined as shown above:

FIG. 5 is a chart representing the characteristics of waveform distortion rate R with respect to groove height. The vertical axis represents the waveform distortion rate R, and horizontal axis indicates the groove height coefficient C1.

Line 51 shows changes in the distortion rate R of induced voltage waveform when the height t of groove 26 is changed variously. Distortion rate R indicates the minimum value of 7.39 when groove height coefficient C1 is 0.2. The value is reduced to two thirds of the distortion rate R=11.1% of the induced voltage waveform 32. Distortion rate R increases with groove height coefficient C1, and the maximum value of 13.3% is reached when groove height coefficient C1 is 0.8. It exhibits a value greater than the distortion rate of the induced voltage waveform 32. This indicates that $0.2 \leq C1 \leq 0.6$ should be preferred. Further, $0.2 \leq C1 \leq 0.4$ allows the distortion rate to be minimized.

FIG. 6 is a chart representing the characteristic of waveform distortion rate R relative to the groove width as the first embodiment of the present invention. The vertical axis indicates waveform distortion rate R, and the horizontal axis represents groove width coefficient C2. Line 61 shows changes of the distortion rate R of induced voltage waveform when the width W1 of groove 26 is changed. When the groove width coefficient C2 is $0.5 \leq C2 \leq 1.2$, distortion rate R is reduced below the distortion rate R=11.1% of the induced voltage waveform 32. Since it deteriorates outside this range, it is preferred that the range of $0.5 \leq C2 \leq 1.2$ is maintained. Further, distortion rate can be minimized when $0.9 \leq C2 \leq 1.1$.

Figure 7A:
FIGS. 7(a) through 7(c) represent a variation of groove 26 in FIG. 1.
Figure 7B:
Figure 7C:

FIG. 7 represents a variation of groove 26. FIG. 7(a) displays the rectangular groove 261 shown in FIGS. 1, 2 and 4, FIG. 7(b) shows a trapezoidal groove 262, and FIG. 7(c) represents a arch-shaped groove 63. They performs almost the same functions as flux barriers.

Figure 8:
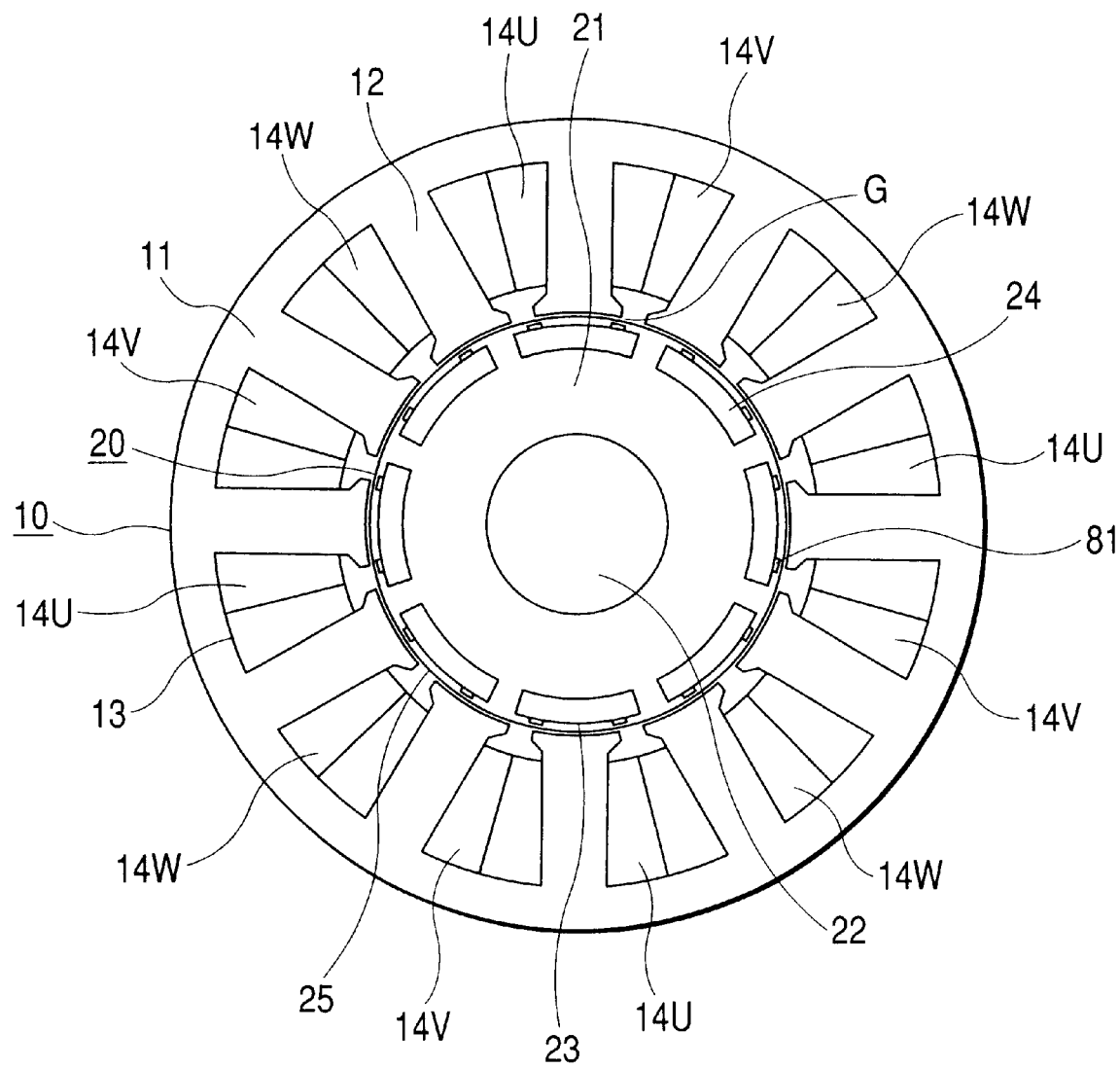
FIG. 8 is a cross sectional view at right angle to the shaft representing the permanent magnet type rotating electrical machine as a second embodiment of the present invention.

FIG. 8 is a cross sectional view at right angle to the shaft representing the permanent magnet type rotating electrical machine as a second embodiment of the present invention. In the drawing, the same components as those in FIG. 1 will be assigned with the same numerals to avoid redundant explanation. The difference from FIG. 1 is that holes 81 extending in the axial direction are formed at electric angles 45 and 135 degrees on the bridge 25 between the permanent magnet insertion hole 23 and rotor surface.

Figure 9:
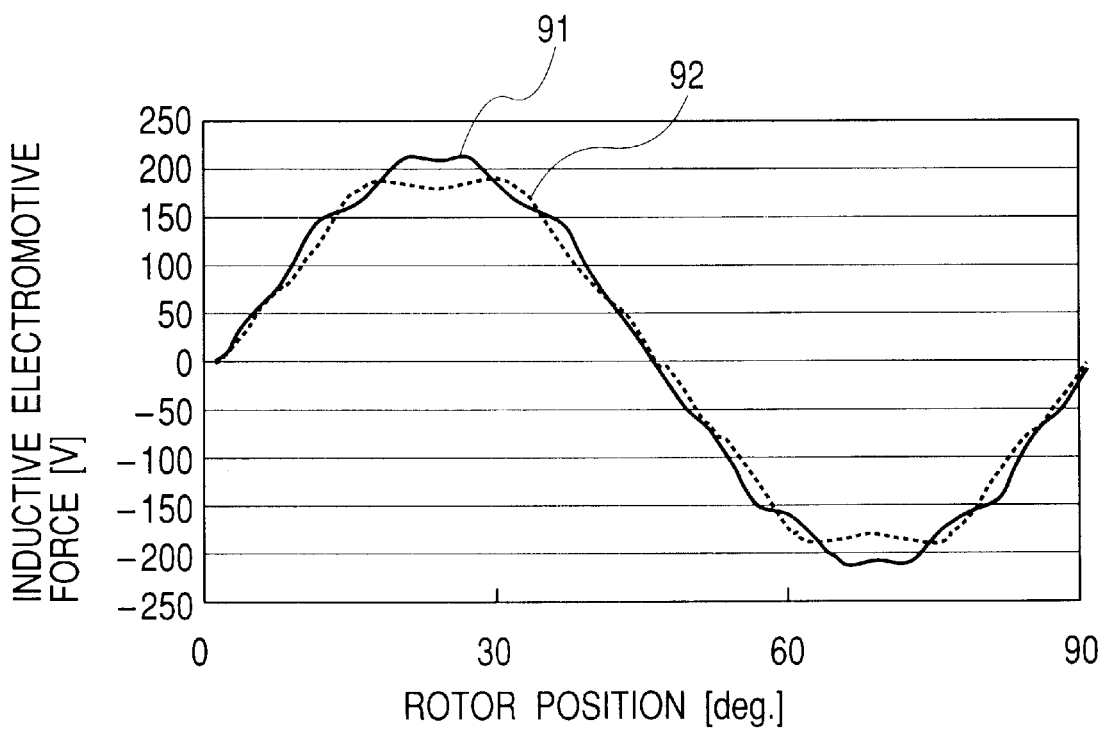
FIG. 9 represents the induced voltage waveform showing the effect of the second embodiment given in FIG. 8.

FIG. 9 represents the induced voltage waveform in the second embodiment given in FIG. 8. The vertical axis indicates the induced voltage and the horizontal axis shows the rotor position (given in terms of a mechanical angle). It indicates the induced voltage waveform 91 according to the embodiment of FIG. 8 where a hole 81 is formed, and induced voltage waveform 92 (same as 32 of FIG. 3) without hole 81. This result is used to calculate the distortion rate R of induced voltage waveform. As a result, the distortion rate R of the induced voltage waveform 91 is 8.09%, suggesting that distortion rate R of the induced voltage waveform can be reduced by formation of hole 81 on bridge 25.

For the reason explained above, formation of the hole 81 allows magnetic saturation partially on the bridge 25, and the surface magnetic flux density distribution of the rotor 20 exhibits sinusoidal waveform, with the result that distortion rate of induced voltage waveform is reduced.

Figure 10:
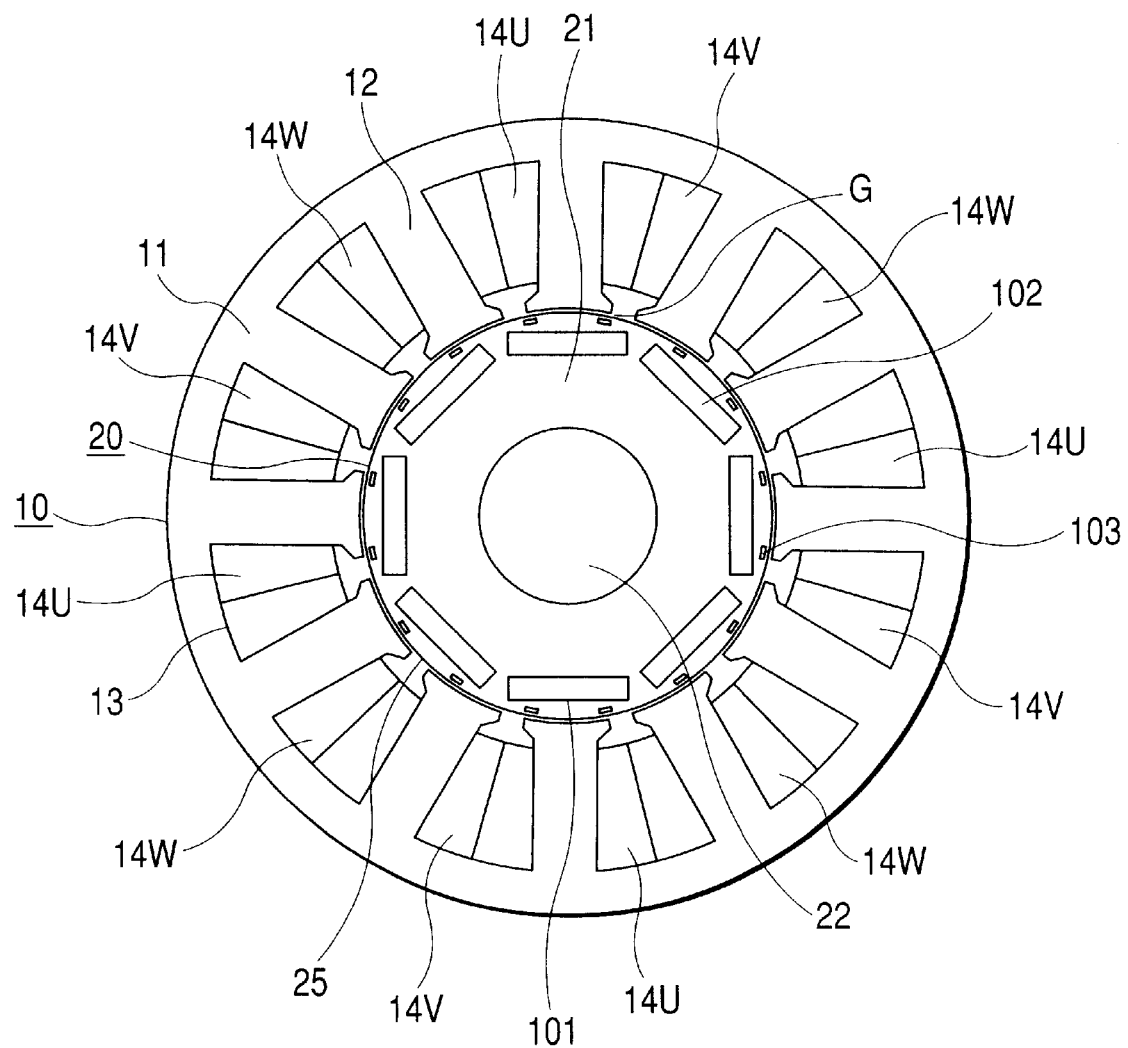
FIG. 10 is a cross sectional view at a right angle to the shaft representing the permanent magnet type rotating electrical machine as the third embodiment of the present invention.

FIG. 10 is a cross sectional view at a right angle to the shaft representing the permanent magnet type rotating electrical machine as the third embodiment of the present invention. In the drawing, the same components as those in FIG. 8 will be assigned with the same numerals to avoid redundant explanation. It indicates an application to the 3-phase, 8-pole, 12-slot permanent magnet type rotating electrical machine using a linear permanent magnet. The difference from FIG. 8 is that eight linear permanent magnets 102 are inserted into the punched permanent magnet insertion holes 23 formed in the rotor core 21 from the axial direction so that N- and S-poles will arranged alternately, and holes 103 are formed as flux barriers on the same bridge as that in FIG. 8.

Figure 11:
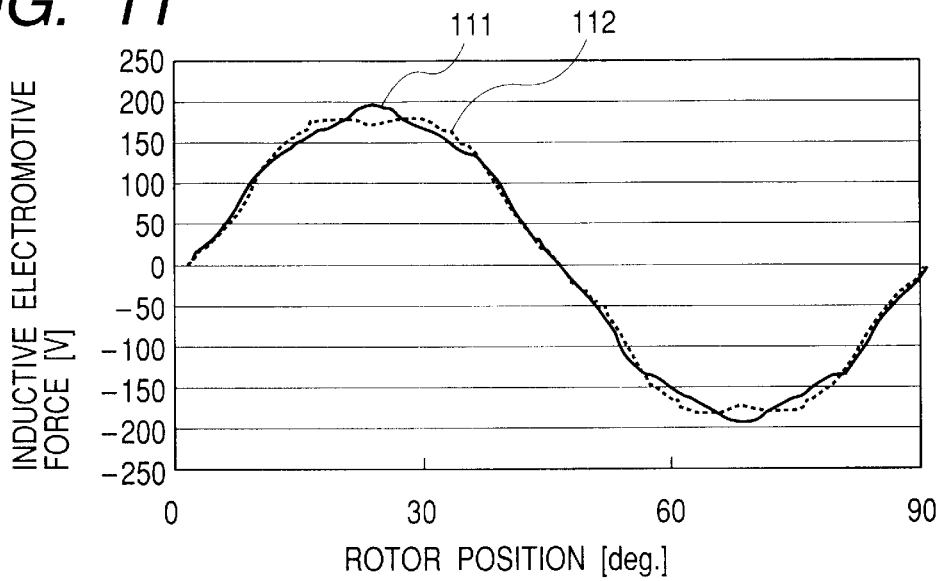
FIG. 11 shows the induced voltage waveform representing the effect of in the third embodiment of FIG. 10.

FIG. 11 shows the induced voltage waveform in the third embodiment of FIG. 10. The vertical axis indicates the induced voltage value, and the horizontal axis denotes the rotor position (shown in terms of mechanical angle). It shows the induced voltage waveform 111 in the embodiment of FIG. 10 when grooves 103 are formed, and induced voltage waveform 112 without grooves 103. This result is used to calculate the distortion rate R of induced voltage waveform. As a result, the distortion rate of the induced voltage waveform 111 is 6.53%, and that of the induced voltage waveform 112 is 10.11%. This indicates that formation of holes 103 on the bridge 25 allows distortion rate to be reduced to about three fifths even in the case of the linear permanent magnet 102.

Thus, in the third embodiment, formation of the hole 103 allows magnetic saturation partially on the bridge 25, and the surface magnetic flux density distribution of the rotor 20 exhibits sinusoidal waveform, with the result that distortion rate of induced voltage waveform is reduced.

Figure 12:
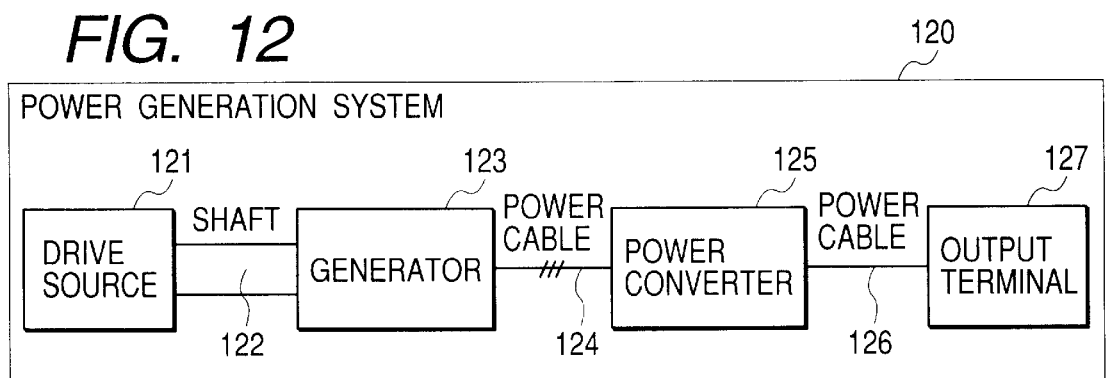
FIG. 12 is a block diagram representing an approximate configuration of a power generation system using the permanent magnet type rotating electrical machine of the present invention.

FIG. 12 is a block diagram representing an approximate configuration of a power generation system using the permanent magnet type rotating electrical machine of the present invention. The power generation system 120 is equipped with a generator 123 comprising any one of the permanent magnet type rotating electrical machines shown in the first to third embodiments wherein the permanent magnet type rotating electrical machine is connected to a drive source 121 through a rotary shaft 122. It is composed of an electric power converter 125 connected to the permanent magnet type rotating electrical machine 123 through a 3-phase electric power cable 124, and an output terminal 127 connected to electric power converter 125 through a 3-phase or 1-phase electric power cable 126. Connection between output terminal 127 and electric power system allows electric power to be fed to the electric power system from the power generation system 120. Such an arrangement reduces the distortion rate of the induced voltage waveform, hence, harmonic wave current flowing into the rotating electrical machine 123. Thus, a highly efficient power generation system can be provided because of reduced loss.

Figure 13:
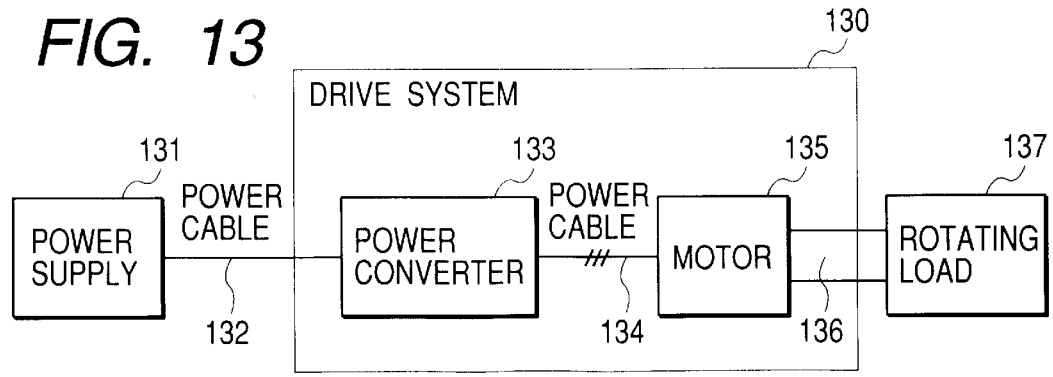
FIG. 13 is a block diagram representing an approximate configuration of a drive system using the permanent magnet type rotating electrical machine of the present invention.

FIG. 13 is a block diagram representing an approximate configuration of a drive system using the permanent magnet type rotating electrical machine of the present invention. In the drawing, this system has an electric power converter 133 connected to the power supply 131 through a 1-phase or 3-phase power supply cable 132. The system also have a motor 135 comprising any one of the permanent magnet type rotating electrical machines shown in the first to third embodiments, wherein this permanent magnet type rotating electrical machine is connected to this electric power converter 133 through a 3-phase electric power cable 134. It shows the drive system 130 capable of driving a rotary load 137 connected to the rotary shaft 136 of the permanent magnet type rotating electrical machine 135. This configuration reduces harmonic wave current flowing into the rotating electrical machine 135, and provides a highly efficient power generation system because of reduced loss.

EFFECTS OF THE INVENTION

The present invention provides a permanent magnet type rotating electrical machine characterized by reduced distortion rate of induced voltage waveform, hence, reduced vibration and noise or by improved efficiency. Further, a highly efficient power generation system or a drive system reduced vibration/noise can be provided by using this machine.

What is claimed is:

1. A permanent magnet rotating electrical machine comprising:
   a stator with concentrated winding provided on a tooth of a stator core; and
   a rotor with permanent magnets embedded therein, said permanent magnet rotating electrical machine characterized in that two flux barriers extending in the axial direction are provided for each magnetic pole of said rotor, said flux barriers located on a bridge between a permanent magnet constituting a magnetic pole and an outer surface of said rotor, such that said flux barriers are located at a position where a width of said permanent magnet is divided into three parts, said three parts including two respective end parts and a center part of said permanent magnet, wherein said end parts and said center part have a width ratio of 1 to 2 or more.

2. A permanent magnet rotating electrical machine comprising:
   a stator with concentrated winding provided on a tooth of a stator core; and
   a rotor with permanent magnets embedded therein, said permanent magnet rotating electrical machine characterized in that two flux barriers extending in the axial direction are provided for each magnetic pole of said rotor, said flux barriers located on a bridge between a permanent magnet constituting a magnetic pole and an outer surface of said rotor, such that a width of said magnetic pole is divided into three parts, said three parts including two respective end parts and a center part of said magnetic pole, wherein said end parts and said center part have a width ratio of 1 to 2 or more.

3. A permanent magnet rotating electrical machine comprising:
   a stator with concentrated winding provided on a tooth of a stator core; and
   a rotor with permanent magnets embedded therein, said permanent magnet rotating electrical machine characterized in that two flux barriers extending in the axial direction are provided for each magnetic pole of said rotor, said flux barriers located on a bridge between said permanent magnet and an outer surface of said rotor in such a way that they are placed at an equally spaced interval over the entire outer periphery of the rotor, and said flux barriers dividing flux paths along a circumferential width of each said permanent magnet into three parts including two end parts and a center part, wherein a ratio of the end parts and the center part is 1 to 2 or more.

4. The permanent magnet rotating electrical machine according to any one of claims 1 to 3 wherein each of said flux barriers is a groove connected to magnet insertion holes of a rotor core wherein said permanent magnets are inserted.

5. The permanent magnet rotating electrical machine of claim 4 wherein said groove is a rectangular, trapezoidal or semicircular groove.

6. The permanent magnet rotating electrical machine according to any one of claims 1 to 3 wherein each of said flux barriers is a hole formed in said bridge.

7. The permanent magnet rotating electrical machine according to any one of claims 1 to 3 wherein height coefficient Cl is defined as $0.2 \leq Cl \leq 0.6$ when t is expressed by an equation $t=Cl\ h$, wherein "t" (mm) is a height measurement of said flux barriers as a groove or hole, and "h" (mm) is a thickness measurement of said bridge.

8. The permanent magnet rotating electrical machine according to any one of claims 1 to 3 wherein groove width coefficient C2 is defined as $0.5 \leq C2 \leq 1.2$ when W2 is expressed by an equation $W2=C2\ Wt$, wherein W2 (mm) is width between adjacent flux barriers of grooves or holes, and Wt (mm) is the width of the tooth of said stator core.

* * * * *